US011639874B2

(12) United States Patent
Aikens

(10) Patent No.: US 11,639,874 B2
(45) Date of Patent: May 2, 2023

(54) ECHELLE SPECTROMETER

(71) Applicant: PerkinElmer Health Sciences, Inc., Waltham, MA (US)

(72) Inventor: David M. Aikens, Chester, CT (US)

(73) Assignee: PerkinElmer Health Sciences, Inc., Waltham, MA (US)

( * ) Notice: Subject to any disclaimer, the term of this patent is extended or adjusted under 35 U.S.C. 154(b) by 0 days.

(21) Appl. No.: 17/501,695

(22) Filed: Oct. 14, 2021

(65) Prior Publication Data

US 2022/0221340 A1    Jul. 14, 2022

Related U.S. Application Data

(60) Provisional application No. 63/135,418, filed on Jan. 8, 2021.

(51) Int. Cl.
*G01J 3/28* (2006.01)
*G01J 3/18* (2006.01)
(Continued)

(52) U.S. Cl.
CPC ........... *G01J 3/1809* (2013.01); *G01J 3/0208* (2013.01); *G01J 3/0216* (2013.01); *G01J 3/26* (2013.01);
(Continued)

(58) Field of Classification Search
CPC ........ G01J 3/02; G01J 3/28; G01J 3/14; G01J 3/18; G01J 3/1809; G01J 3/0208;
(Continued)

(56) References Cited

U.S. PATENT DOCUMENTS 4,995,721 A * 2/1991 Krupa ................... G01J 3/1809
356/328
5,206,499 A * 4/1993 Mantravadi ........... G01S 3/7867
359/399

(Continued)

FOREIGN PATENT DOCUMENTS

WO    WO 2019/106443    6/2019
WO    WO 2020/033953    2/2020

OTHER PUBLICATIONS

International Search Report and Written Opinion for corresponding PCT Application No. PCT/US2022/011793, dated May 11, 2022 pp. 1-15.

(Continued)

*Primary Examiner* — Abdullahi Nur
(74) *Attorney, Agent, or Firm* — Fish & Richardson P.C.

(57) ABSTRACT

Spectrometers include an optical assembly with optical elements arranged to receive light from a light source and direct the light along a light path to a multi-element detector, dispersing light of different wavelengths to different spatial locations on the multi-element detector. The optical assembly includes: (i) a collimator arranged in the light path to receive the light from the light source, the collimator including a mirror having a freeform surface; (2) a dispersive sub-assembly including an echelle grating, the dispersive sub-assembly being arranged in the light path to receive light from the collimator; and (3) a Schmidt telescope arranged in the light path to receive light from the dispersive sub-assembly and focus the light to a field, the multi-element detector being arranged at the field.

21 Claims, 5 Drawing Sheets

(51) Int. Cl.
   *G01J 3/02*     (2006.01)
   *G01J 3/26*     (2006.01)
   *G01J 3/12*     (2006.01)

(52) U.S. Cl.
   CPC . *G01J 2003/1208* (2013.01); *G01J 2003/262* (2013.01)

(58) Field of Classification Search
   CPC .... G01J 3/0216; G01J 3/26; G01J 2003/1208; G01J 2003/262; G01J 3/2803; G01J 3/22; G01J 3/00; G01J 3/021; G01J 3/0291
   See application file for complete search history.

(56) References Cited

U.S. PATENT DOCUMENTS

| | | | |
|---|---|---|---|
| 2002/0001079 A1 | 1/2002 | Paolinetti et al. | |
| 2016/0299331 A1* | 10/2016 | Rowe | G02B 23/16 |
| 2019/0025121 A1* | 1/2019 | Münch | G01J 3/2803 |

OTHER PUBLICATIONS

H. Becker-Ross et al., "Echelle spectrometers and charge-coupled devices," Spectrochimica Acta Part B., vol. 52(1997):1367-1375.
G. Wolfschnudt "The development of the Schmidt telescope," Astronomische Nachrichten, vol. 330 (6):555-561 (Jun. 17, 2009).

* cited by examiner

ECHELLE SPECTROMETER

CROSS-REFERENCE TO RELATED APPLICATIONS

This application claims priority to Provisional Application No. 63/135,418, entitled "ECHELLE SPECTROMETER," and filed on Jan. 8, 2021, the entire contents of which are incorporated herein by reference.

BACKGROUND

A spectrometer is an instrument used to measure the spectral content of a light source. Spectrometers conventionally use a combination of optical elements to spatially separate, or disperse, light from a source into its different component wavelengths. The optical elements direct the dispersed light onto a detector array such that the location of each detector element corresponds to a component of the light spectrum. Accordingly, information about the spectral content of the light source can be ascertained from the illumination pattern at the detector array.

Generally, the spectral range (wavelengths that can be analyzed) and resolution (the difference between two wavelengths that can be differentiated) of a spectrometer are both a function of the amount of dispersion in the spectrometer. Typically, more dispersion provides better resolution at the cost of spectral range and vice versa. In spectrometers using a plane grating for dispersion, it is common to use the first diffractive order (M=1) at a modest angle of incidence (e.g., about 10 degrees). Such a grating will typically have 1,000 or more lines per mm to provide the necessary dispersion.

In certain spectrometers, an echelle grating is used as a primary dispersive element, in conjunction with a cross-disperser. An echelle grating is typically a low density grating (e.g., fewer than 100 lines per mm for ultraviolet, visible, and near infrared wavelengths) that is designed to be used in retro-reflection (e.g., in a Littrow configuration) at a very high angle of incidence (e.g., 45 degrees or more) and with very high orders (e.g., at M=20 or more). Compared to a plane grating, this type of grating generally provides much higher dispersion at multiple orders simultaneously, resulting in better resolution when used in a spectrometer.

In order to extract the wavelength information, an additional dispersive element with much lower dispersion, called a cross-disperser, is commonly used to separate the orders in an echelle spectrometer. This technique can provide echelle spectrometers with large spectral range but at much higher spectral resolution than can be achieved with a conventional spectrometer (e.g., a spectrometer that uses a plane grating instead of an echelle grating). For example, a typical Czerny-Turner type of spectrometer might have 600 nm of spectral range with 1 nm of spectral resolution, while a typical echelle spectrometer might have the same spectral range with 0.01 nm of spectral resolution.

SUMMARY

Echelle spectrometers that feature a Schmidt telescope-type imaging system are described. The spectrometers include a light collimator having a freeform surface (e.g., a freeform mirror) that can be used to reduce (e.g., eliminate) the need for a Schmidt corrector in the Schmidt telescope. In some embodiments, a Schmidt corrector with a freeform surface can be used too.

In general, in a first aspect, the disclosure features a spectrometer, including an optical assembly with a plurality of optical elements arranged to receive light from a light source and direct the light along a light path to a multi-element detector, dispersing light of different wavelengths to different spatial locations on the multi-element detector, the optical assembly including: (i) a collimator arranged in the light path to receive the light from the light source, the collimator including a mirror having a freeform surface; (2) a dispersive sub-assembly including an echelle grating, the dispersive sub-assembly being arranged in the light path to receive light from the collimator; and (3) a Schmidt telescope arranged in the light path to receive light from the dispersive sub-assembly and focus the light to a field, the multi-element detector being arranged at the field.

Embodiments of the spectrometer can include one or more of the following features. For example, the freeform surface can be shaped to reduce optical aberrations associated with the Schmidt telescope. The optical aberrations can include spherical aberration, field constant coma, and/or field constant astigmatism.

The freeform surface can be shaped according to a parabolic surface modified by one or more non-zero coefficients of orthogonal polynomial functions (e.g., Zernike polynomials, Chebyshev polynomials).

The echelle grating can be arranged to disperse the light into constituent wavelengths in a first plane and the collimator comprises a second dispersive optical element arranged to disperse the light into constituent wavelengths along a second plane orthogonal to the first plane. The second dispersive optical element can be a diffraction grating. In some embodiments, the second dispersive optical element is a prism. The prism can include two flat, non-parallel surfaces arranged in the light path. The second dispersive element can be arranged in the light path so that the light makes a double pass through the second dispersive element. The second dispersive element can be arranged in the light path so that the light makes a first pass through the second dispersive element before incidence on the echelle grating and the light makes a second pass through the second dispersive element after incidence on the echelle grating. The second dispersive element can be arranged in the light path so that the light makes both passes through the second dispersive element after incidence on the echelle grating.

The Schmidt telescope can be an off-axis Schmidt telescope.

The Schmidt telescope can include a concave mirror and a field lens. The mirror can be a spherical mirror. The field lens can be configured to reduce a curvature of an image field of the Schmidt telescope. The field lens can be an aspheric lens. The field lens can be tilted with respect to an optical axis of the Schmidt telescope. The Schmidt telescope can include a Schmidt corrector arranged in the light path between the dispersive sub-assembly and the mirror of the Schmidt telescope. The Schmidt corrector can be a mirror. The Schmidt corrector can include an aspheric optical surface. The Schmidt corrector can include a freeform surface.

The spectrometer can include an aperture arranged in the light path between the light source and the optical assembly.

The optical assembly can further include a Schmidt corrector arranged in the light path downstream from the dispersive sub-assembly.

The light can include visible light, ultraviolet light, and/or infrared light.

The light source can be an inductively coupled plasma (ICP) system.

The optical assembly can be arranged for operation across a band of wavelengths in a range from about 160 nm to about 900 nm.

The spectrometer can have a resolution of 10 pm or less.

Among other advantages, the echelle spectrometers disclosed can feature compact designs with a relatively small number of optical elements. The optical elements can be less complex and/or easier to manufacture than elements used in comparative spectrometers that do not include the innovations disclosed herein. Accordingly, the designs can provide comparable performance at less expense than the comparative spectrometers.

BRIEF DESCRIPTION OF THE DRAWINGS

Like reference numerals refer to like elements.

DETAILED DESCRIPTION

It is increasingly common, when designing an optical imaging system, to correct certain aberrations by including an aspheric optical element at a well-defined pupil of the optical imaging system because a correction applied at the pupil affects all image field points similarly. For example, echelle spectrometers generally include an optical imaging system, or telescope, after the dispersion that creates a well-defined focus for all wavelengths in the spectrometer. Such an imaging system is a Schmidt telescope and it is customary to include a corrector plate at a location approximately one radius away from the focusing mirror which corresponds to the pupil's location in a conventional Schmidt telescope. The inventor has recognized and appreciated that this limitation is not a requirement and that, instead, aberration correction can be performed at other locations where all image field points experience substantially the same correction. For example, in some embodiments described herein, all image field points experience the same aberration correction at the surface of the first optical element the input light encounters, e.g., a parabolic mirror.

Figure 1:
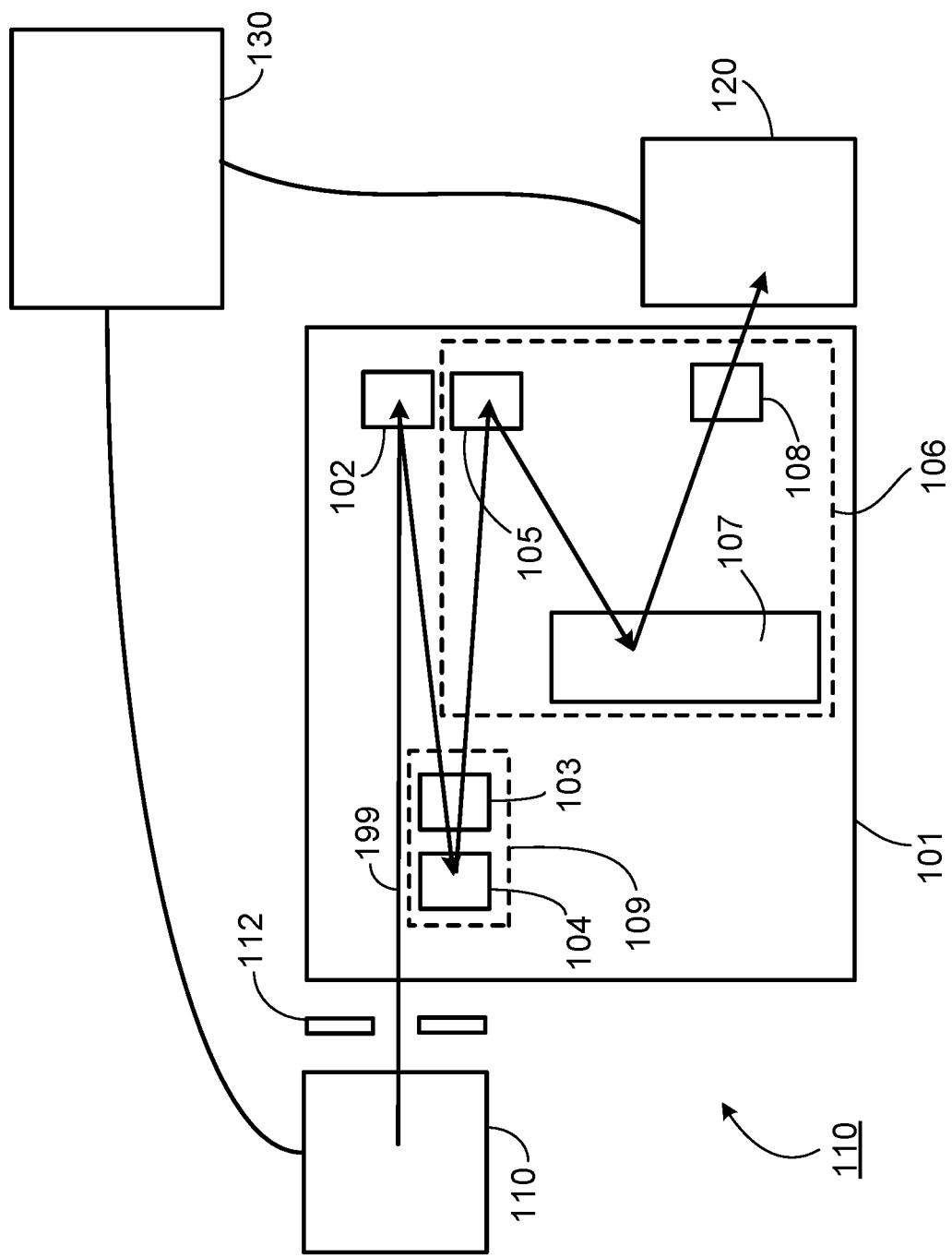
FIG. 1 is a schematic diagram of an example echelle spectrometer.

Referring to FIG. 1, an example echelle spectrometer 100 includes an optical assembly 101 arranged to receive light from a light source 110 and direct the light to a multi-element detector 120 while spatially separating the light into constituent wavelengths at detector 120. A computer controller 130 in communication with light source 110 and detector 120 controls and coordinates the operation of both the light source and the detector to collect data about the light intensity patterns at the detector for different light emission samples.

Optical assembly 101 includes a collimator 102 (e.g., a parabolic mirror), a dispersive sub-assembly 109 and a Schmidt telescope 106 (e.g., an off-axis Schmidt telescope). Dispersive sub-assembly 109 includes an echelle grating 104 and a cross-disperser 103 (e.g., a prism or a grating). Schmidt telescope 106 includes (optionally) a Schmidt corrector 105, a concave mirror 107 (e.g., a spherical mirror), and a field lens 108 (e.g., an aspheric lens). An aperture 112 (e.g., a slit aperture) is arranged between light source 110 and optical assembly 101.

During operation, light 199 composed of multiple constituent wavelengths from light source 110 enters optical assembly 101 through aperture 112. Specifically, the light path through optical assembly 101 is as follows. Light from light source 110 diverges through aperture 112 and is incident on collimator 102, which collimates the divergent light and directs it towards dispersive sub-assembly 109. For a reflective collimator, a parabolic mirror can suffice. However, in some embodiments, using a freeform mirror surface as collimator 102 can allow the collimator to perform some or all of the aberration correction functions a Schmidt corrector typically performs in a conventional Schmidt telescope imager. Accordingly, collimator 102 can be a mirror having a freeform surface shaped to both collimate light from light source 110 and reduce, e.g., spherical aberration, field constant coma, and/or field constant astigmatism in the imaging system.

In general, the freeform surface of the collimator 102 can be described by a mathematical function, such as a polynomial. For example, in the embodiments provided below, the mathematical function used is a series of polynomial terms that are orthogonal over the unit disk referred to as Zernike polynomials. In the Zernike polynomial series, there are even terms and odd terms of varying order. The even terms are defined as $$Z_n^m(\rho,\varphi)=R_n^m(\rho,\varphi)\cos(m\varphi)$$

(even function over the azimuthal angle $\varphi$)

The odd terms are defined as $$Z_n^{-m}(\rho,\varphi)=R_n^m(\rho,\varphi)\sin(m\varphi)$$

where m and n are non-negative integers (m=0 only for the even variant), $\rho$ is the radial distance on the unit circle, $\varphi$ is the azimuthal angle, and $$R_n^m(\rho,\varphi) = \sum_{k=0}^{\frac{n-m}{2}} \frac{(-1)^k (n-k)!}{k!\left(\frac{n+m}{2}-k\right)!\left(\frac{n-m}{2}-k\right)!}\rho^{n-2k}$$

Embodiments are not limited to freeform surfaces based on a Zernike polynomial series. Other polynomial mathematical descriptions could be used, mutatis muntandis (e.g., Chebyshev polynomials). ISO 10110-19 describes several mathematical formalisms for annotating a freeform or "general" surface, including, for example, a simple non-orthogonal polynomial in x and y, or a non-uniform radial basis spline (NURBS) function. That standard provides a reference for the Zernike polynomial described above, but also provides a reference for the so-called "Forbes" polynomial. Additionally, ISO 14999-2 provides a convenient description for Zernike surface as well as Legendre polynomials, both for x, y coordinates and for a polar coordinate system, which can be used to describe a freeform surface.

The Zernike polynomial terms can be ordered in many ways and the number of orthogonal terms is unlimited. In the popular optical design program Zemax, for example, uses the "University of Arizona Fringe Coefficients". The first 25 terms of the Zernike polynomial for this ordering convention is shown below, to provide an illustration of the equation.

TABLE I

| Term | ZERNIKE FRINGE POLYNOMIALS $Z(\rho, \varphi)$ |
|---|---|
| 1 | 1 |
| 2 | $\rho \cos \varphi$ |
| 3 | $\rho \sin \varphi$ |
| 4 | $2\rho^2 \dots 1$ |
| 5 | $\rho^3 \cos 2\varphi$ |
| 6 | $\rho 3 \sin \varphi$ |
| 7 | $(3\rho^2 - 2) \rho \cos \varphi$ |
| 8 | $(3\rho^2 - 2) \rho \sin \varphi$ |
| 9 | $6\rho^4 \dots 6\rho^3 + 1$ |
| 10 | $\rho^3 \cos 3\varphi$ |
| 11 | $\rho^3 \sin 3\varphi$ |
| 12 | $(4\rho^2 - 3) \rho^2 \cos 2\varphi$ |
| 13 | $(4\rho^2 - 3) \rho^2 \sin 2\varphi$ |
| 14 | $(10\rho^4 - 12\rho^2 + 3) \rho \cos \varphi$ |
| 15 | $(10\rho^4 - 12\rho^2 + 3) \rho \sin \varphi$ |
| 16 | $20\rho^6 \dots 30\rho^4 + 12\rho^2 \dots 1$ |
| 17 | $\rho^4 \cos 4\varphi$ |
| 18 | $\rho^4 \sin 4\varphi$ |
| 19 | $(5\rho^3 - 4) \rho^3 \cos 3\varphi$ |
| 20 | $(5\rho^2 - 4) \rho^3 \sin 3\varphi$ |
| 21 | $(15\rho^4 - 20\rho^2 + 6) \rho^2 \cos 2\varphi$ |
| 22 | $(15\rho^4 - 20\rho^2 + 6) \rho^2 \sin 2\varphi$ |
| 23 | $(35\rho^6 - 60\rho^4 + 30\rho^2 - 4) \rho \cos \varphi$ |
| 24 | $(35\rho^6 - 60\rho^4 + 30\rho^2 - 4) \rho \sin \varphi$ |
| 25 | $70\rho^8 - 140\rho^6 + 90\rho^4 - 20\rho^2 + 1$ |

While the term freeform surface can be described using any of the above conventions, when the term freeform surface is used in the present application it is used to refer to a surface that has no axis of symmetry. Accordingly, freeform surfaces are more complicated than a planar surface, a spherical surface, a parabolic surface, or an aspheric surface (which generally includes an axis of rotational symmetry). For example, some embodiments use a collimator 102 that includes a mirror having a freeform surface. In these embodiments, the collimator 102 is has a curvature that cannot be described using a simple parabola (e.g., the collimator 102 is not merely a parabolic mirror).

Referring back to FIG. 1, the collimated light passes first through cross-disperser 103 before being incident on echelle grating 104. Cross-disperser 103 can be a prism that includes two flat, non-parallel surfaces arranged in the light path. The light reflects from echelle grating 104 before passing through cross-disperser 103 a second time. In other words, the light makes a double pass through cross-disperser 103. The dispersive sub-assembly 109 serves to disperse the light into constituent wavelengths in two-dimensions, in which echelle grating 104 diffracts the light into different orders in a first plane while the cross-disperser 103 disperses or diffracts the light, separating it into constituent wavelengths in a second plane (e.g., orthogonal to the first plane).

Echelle grating 104 is typically composed of a number of parallel grating lines with a spatial frequency on the order of the wavelength of the light. In some embodiments, echelle grating is a reflective blazed grating arranged such that the reflected light is dispersed into several high diffraction orders. In certain cases, echelle grating 104 can be arranged at or close to Littrow Diffracted orders at different wavelengths can overlap. The plane of the grating may be arranged at a glancing angle with respected to the collimated light direction in such arrangements. The resulting optical output from a typical echelle grating can include bands of light composed of different, but overlapping, wavelength ranges.

The dispersed light is next reflected by Schmidt corrector 105 and directed towards concave mirror 107 (e.g., a spherical mirror) of Schmidt telescope 106. Schmidt corrector 105 can be an aspheric mirror shaped to reduce spherical aberrations caused by concave mirror 107. In some embodiments, Schmidt corrector 105 is a freeform mirror shaped to both reduce spherical aberrations in the image and reduce coma, astigmatism and/or other aberrations. However, in certain embodiments, aberrations in the imaging system can be adequately corrected without a Schmidt corrector at all. In other words, all of the aberration correction (e.g., spherical aberration, coma, and/or astigmatism) may be performed by the collimator 102 with no additional aberration correction being performed by any other optical elements in the optical assembly 101. Finally, light reflected and focused by concave mirror 107 passes through field lens 108, being imaged on detector 120. Field lens 108 can be a field-flattening lens for reducing field curvature, and can include asphericity for reducing other field-dependent aberrations at detector 120. In certain embodiments, field lens 108 is titled with respect to an optical axis of Schmidt telescope 106.

In some embodiments, Schmidt telescope 106 is a relatively fast imaging system, e.g., having an f-number of f/6 or faster, f/5 or faster, f/4 or faster, such as f/3.

In general, light source 110 can be any light source capable of producing light having an intensity and emission pattern suitable for analysis by the spectrometer. In some implementations, light source 110 can be an inductively coupled plasma (ICP) source in which samples for spectral analysis are injected into a plasma via a sample introduction device. The sample introduction device may be fluidically coupled to a torch. An induction device, controlled by computer controller 130, may provide radio frequency energy into the torch to sustain an inductively coupled plasma in the torch. Emission from the analyte species is coupled into optical assembly 101 through aperture 112 and dispersed onto detector 120 by the optical assembly.

Detector 120 can be any detector that can detect and spatially resolve incident light in a range of operable wavelengths of spectrometer 100. In some implementations, detector 120 is a charged coupled device (CCD) camera or a complementary metal oxide semiconductor (CMOS) detector. Generally, the operable wavelength range of spectrometer 100 can include wavelengths across a wide spectrum, including ultraviolet, visible, and/or infrared wavelengths. In some embodiments, the operable wavelength range of spectrometer 100 is from about 160 nm to about 900 nm. The spectrometer can have a resolution of 50 picometers (pm) or less (e.g., 20 pm or less, 10 pm or less, 5 pm or less).

Figure 2:
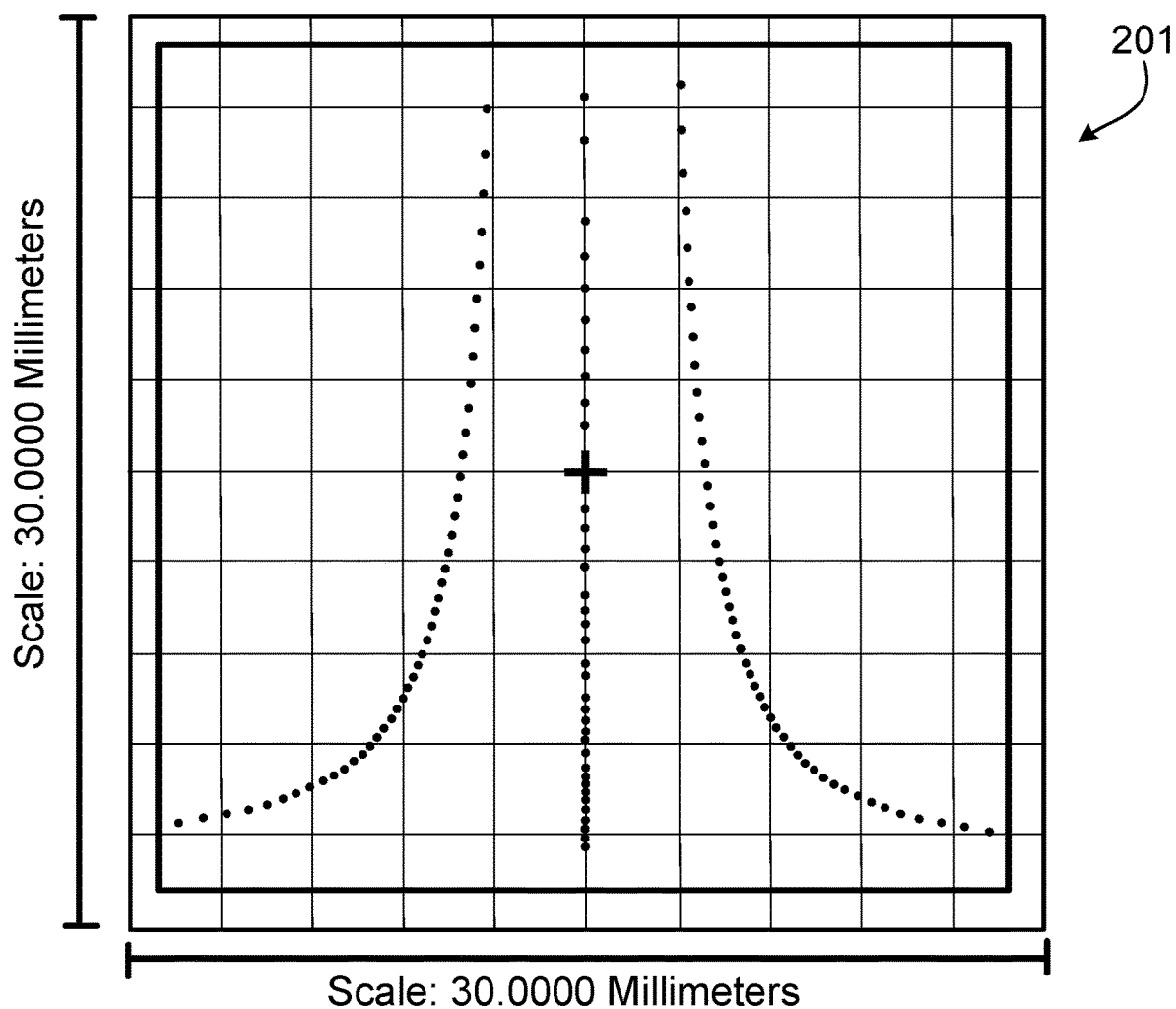
FIG. 2 is an example echellogram.

Data collected from detector 120 can be used by computer controller 130 to generate an echellogram, which refers to a two-dimensional plot corresponding to the intensity pattern at the detector where each point in the plot is generated by a specific wavelength and a specific diffraction order. An example echellogram 201 is shown in FIG. 2. Here, echellogram 201 shows emission intensities across a spectral range of 167 nm to over 850 nm on a detector, such as detector 120 in spectrometer 100. Echellograms are often used for optical emission spectroscopy (OES), for which spectrometer 100 can be used. In such examples, an echellogram may be used to identify one or more elements present in a sample.

Figure 3:
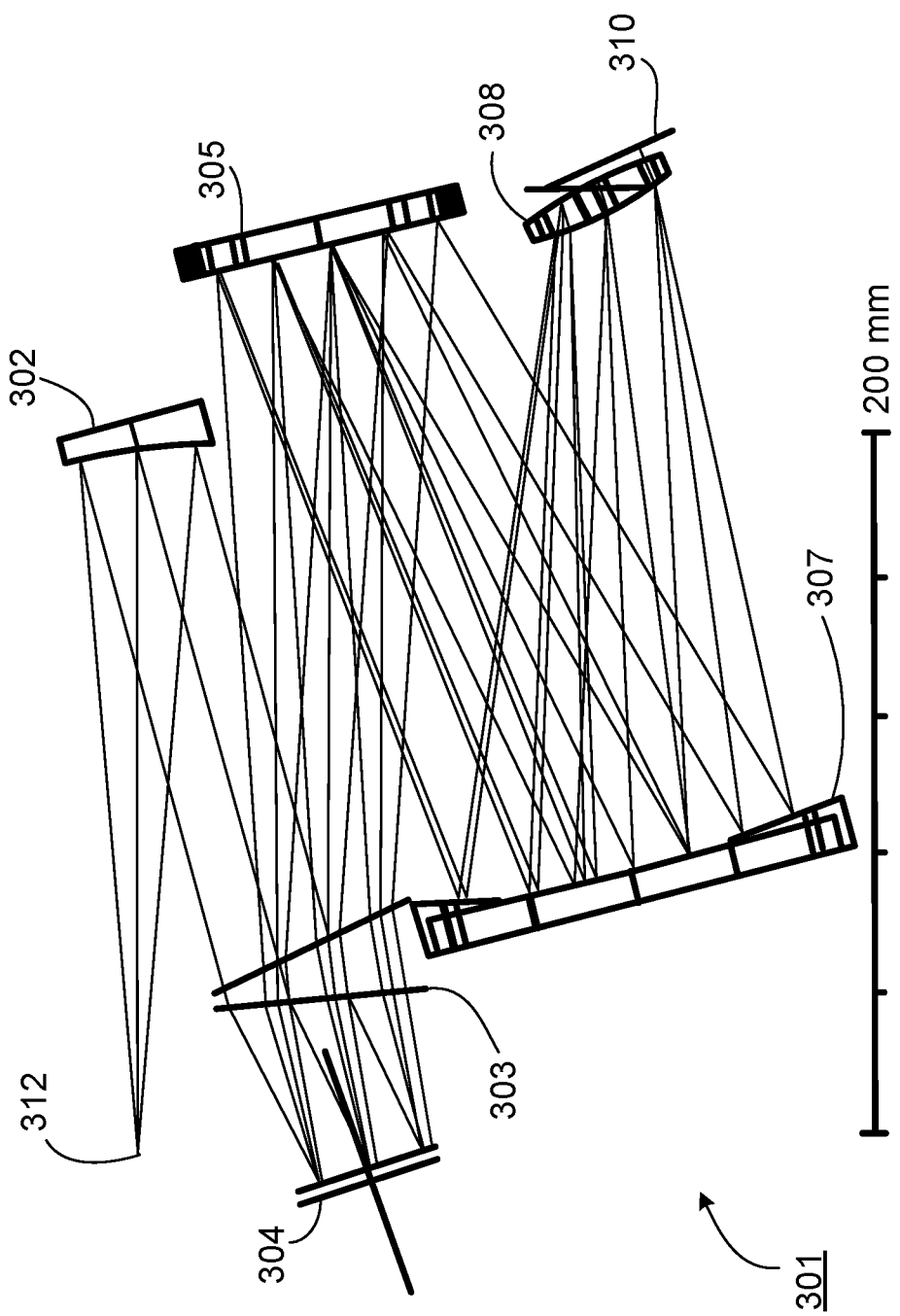
FIG. 3 is an optical layout of an example optical assembly for an echelle spectrometer. This drawing is to scale.

Referring to FIG. 3, an example optical assembly 301 for spectrometer 100 includes a collimator 302 composed of a freeform mirror, a prism 303, an echelle grating 304, a Schmidt corrector 305 composed of a freeform mirror, a spherical mirror 307, and a field lens 308. Optical assembly 300 receives light from an aperture at point 312 and directs the light along an optical path to an image field at an image plane 310. A file including a prescription table providing details of optical assembly 301 is provided in Tables II-III, below.

In this example, collimator 302 is a parabolic mirror, re-optimized with Zernike coefficients Z5-Z16. Schmidt corrector 305 is a mirror with a Zernike freeform surface in which coefficients for Z4 through Z25 were allowed to vary during design optimization.

An advantage of this architecture is that the Schmidt telescope is independent of the diffractor elements. This can allow for easier pre-alignment and testing of the imager before integration into the spectrometer compared to designs in which the telescope and one or more elements of the dispersive sub-assembly are combined. Another advantage of this architecture is that cross-disperser prism 303 and Echelle grating 304 and are close together, so the x- and y-distribution of field angles are about at the same distance from the spherical primary mirror (i.e., less pupillary astigmatism). This can improve symmetry between the two axes for coma and astigmatism control. In addition, echelle grating 304 can work nearly at Littrow, improving efficiency.

TABLE II

SURFACE DATA SUMMARY

| Surface | Radius (mm) | Thickness (mm) | Glass | Clear Diam. (mm) | Mech Diam (mm) | Conic |
|---|---|---|---|---|---|---|
| OBJ | Infinity | 0 | | 0.3434663 | 0.3434663 | 0 |
| 1 | Infinity | 0 | | 0.3434663 | 0.3434663 | 0 |
| 2 | — | 200 | | — | — | — |
| 3 | −400 | −200 | MIRROR | 139.637 | 41 | −1 |
| 4 | — | 203.4665 | | — | — | — |
| 5 | Infinity | 0 | | 35.53027 | 35.53027 | 0 |
| 6 | — | −150 | | — | — | — |
| 7 | — | 0 | | — | — | — |
| 8 | — | −15 | SIO2 | 53.34466 | 53.34466 | — |
| 9 | — | −50 | | 52.65105 | 52.65105 | — |
| 10 | — | 0 | | — | — | — |
| 11 | — | 0 | | — | — | — |
| STO | Infinity | 0 | MIRROR | 75.73959 | 75.73959 | 0 |
| 13 | — | 0 | | — | — | — |
| 14 | Infinity | 0 | | 45.84674 | 45.84674 | 0 |
| 15 | — | 50 | | — | — | — |
| 16 | — | 15 | SIO2 | 51.15427 | 51.15427 | — |
| 17 | — | 0 | | 55.35947 | 55.35947 | — |
| 18 | — | 0 | | — | — | — |
| 19 | — | 0 | | — | — | — |
| 20 | Infinity | 200 | | 42.51369 | 42.51369 | 0 |
| 21 | Infinity | 0 | | 42.62043 | 42.62043 | 0 |
| 22 | — | 0 | | — | — | — |
| 23 | Infinity | 0 | MIRROR | 43.2127 | 43.2127 | 0 |
| 24 | — | 0 | | — | — | — |
| 25 | Infinity | −200 | | 42.58446 | 42.58446 | 0 |
| 26 | — | 0 | | — | — | — |
| 27 | 379.5836 | 0 | MIRROR | 45.6699 | 45.6699 | 0 |
| 28 | — | 0 | | — | — | — |
| 29 | Infinity | 188.9306 | | 45.85088 | 45.85088 | 0 |
| 30 | — | 0 | | — | — | — |
| 31 | — | 0 | | — | — | — |
| 32 | 79.25167 | 8 | SIO2 | 4.997561 | 8.092619 | 0 |
| 33 | −1468.145 | 0 | | 8.092619 | 8.092619 | 0 |
| 34 | — | 0 | | — | — | — |
| 35 | Infinity | 8 | | 6.400318 | 6.400318 | 0 |
| 36 | — | 0 | | — | — | — |
| IMA | Infinity | | | 6.267267 | 6.267267 | 0 |

TABLE III

SURFACE DATA DETAIL

Surface OBJ STANDARD slit
Surface 1 STANDARD
Surface 2 COORDBRK tilt to coil vertex

| | |
|---|---|
| Decenter X | 0 |
| Decenter Y | 0 |
| Tilt About X | −15 |
| Tilt About Y | 0 |
| Tilt About Z | 0 |
| Order | Decenter then tilt |

Surface 3 FZERNSAG collimator

| | |
|---|---|
| Mirror Substrate | Flat, Thickness = 5.00000E+00 |
| Zernike Decenter X | 0 |
| Zernike Decenter Y | −52.66 |

TABLE III-continued

SURFACE DATA DETAIL

| | |
|---|---|
| Normalization Radius | 70 |
| Zernike Term 1 | 0 |
| Zernike Term 2 | 0 |
| Zernike Term 3 | 0 |
| Zernike Term 4 | 0 |
| Zernike Term 5 | −9.2553901e−05 |
| Zernike Term 6 | 0.0014911969 |
| Zernike Term 7 | −0.006717006 |
| Zernike Term 8 | 0.01573876 |
| Zernike Term 9 | 0.0015667884 |
| Zernike Term 10 | 0.010804217 |
| Zernike Term 11 | 0.015920273 |
| Zernike Term 12 | 0.00090123067 |
| Zernike Term 13 | −0.0012581525 |
| Zernike Term 14 | 0.0028138392 |
| Zernike Term 15 | −0.0025174615 |
| Zernike Term 16 | −0.00066551695 |
| Aperture | Circular Aperture |
| Minimum Radius | 0 |
| Maximum Radius | 20.5 |
| X-Decenter | 0 |
| Y-Decenter | −52.661 |
| Surface 4 COORDBRK return to coil normal | |
| Decenter X | 0 |
| Decenter Y | 0 |
| Tilt About X | 15 |
| Tilt About Y | 0 |
| Tilt About Z | 0 |
| Order | Decenter then tilt |
| Surface 5 STANDARD | |
| Surface 6 COORDBRK rotate 15 deg | |
| Decenter X | 0 |
| Decenter Y | 0 |
| Tilt About X | −15 |
| Tilt About Y | 0 |
| Tilt About Z | 0 |
| Order | Decenter then tilt |
| Surface 7 COORDBRK tilt—dec prism | |
| Decenter X | 0 |
| Decenter Y | −10 |
| Tilt About X | 0 |
| Tilt About Y | 0 |
| Tilt About Z | 0 |
| Order | Decenter then tilt |
| Surface 8 TILTSURF prism surface 1 | |
| X Tangent | 0 |
| Y Tangent | −0.18 |
| Aperture | Rectangular Aperture |
| X Half Width | 30 |
| Y Half Width | 30 |
| Surface 9 TILTSURF prism surface 2 | |
| X Tangent | 0 |
| Y Tangent | 0.18 |
| Aperture | Rectangular Aperture, Pickup From Surface 8 |
| X Half Width | 30 |
| V Half Width | 30 |
| Surface 10 COORDBRK | |
| Decenter X | 0 |
| Decenter Y | 0 |
| TiltAbout X | −4 |
| Tilt About Y | |
| Tilt About Z | 0 |
| Order | Decenter then tilt |
| Surface 11 COORDBRK Gamma and blaze angle | |
| Decenter X | 0 |
| Decenter V | 0 |
| Tilt About X | 0 |
| Tilt About Y | 63 |
| Tilt About Z | 0 |
| Order | Decenter then tilt |

TABLE III-continued

SURFACE DATA DETAIL

Surface STO DGRATING echelle

| | | | | | | |
|---|---|---|---|---|---|---|
| Mirror Substrate | | Flat, Thickness = 1.00000E+01 | | | | |
| Tilt/Decenter Order | Decenter X | Decenter Y | Tilt X | Tilt V | Tilt Z | |
| Before surface | 0 | 0 | 0 | 0 | 90 | Decenter, Tilt |
| After surface | −0 | −0 | −0 | −0 | −90 | Tilt, Decenter |

Lines/μm 0.087
Diffraction Order 97
Aperture Rectangular Aperture
X Half Width 21.5
Y Half Width 40.5

Surface 13 COORDBRK Return blaze and gamma angle

Decenter X 0
Decenter Y 0
Tilt About X 0
Tilt About Y −63
Tilt About Z 0
Order Tilt then decenter Surface 14 STANDARD
Surface 15 COORDBRK return to prism 2

Coordinate Return Solve: Orientation XYZ, To Surface 9
Decenter X −0
Decenter Y −0
Tilt About X 4
Tilt About Y −0
Tilt About Z 0
Order Tilt then decenter Surface 16 TILTSURF prism s2 redux X Tangent 0
Y Tangent 0.18
Aperture Rectangular Aperture, Pickup From Surface 9
X Half Width 30
V Half Width 30

Surface 17 TILTSURF prism s 1 redux

X Tangent 0
Y Tangent −0.18
Aperture Rectangular Aperture, Pickup From Surface 8
X Half Width 30
Y Half Width 30

Surface 18 COORDBRK return prism AOI

Coordinate Return Solve Orientation XYZ, To Surface 17
Decenter X −0
Decenter Y −0
Tilt About X 0
Tilt About Y −0
Tilt About Z 0
Order Tilt then decenter Surface 19 COORDBRK Center chief ray on imager Decenter X 1.2511139
Decenter Y −5.3800819
Tilt About X 14.857351
Tilt About Y 1.2114754
Tilt About Z 0
Order Decenter then tilt Surface 20 STANDARD
Surface 21 STANDARD
Surface 22 COORDBRK Decenter X 0
Decenter Y 0
Tilt About X −13
Tilt About Y 0
Tilt About Z 0
Order Decenter then tilt Surface 23 FZERNSAG Corrector Mirror Substrate Flat, Thickness = 7.00000E+00
Normalization Radius 25
Zernike Term 1 0
Zernike Term 2 0
Zernike Term 3 0
Zernike Term 4 0.02567814

TABLE III-continued

SURFACE DATA DETAIL

| | |
|---|---|
| Zernike Term 5 | −0.018320372 |
| Zernike Term 6 | 2.4770878e−05 |
| Zernike Term 7 | −9.6801169e−05 |
| Zernike Term 8 | 0.0029838527 |
| Zernike Term 9 | 0.00013242813 |
| Zernike Term 10 | −6.2266901e−06 |
| Zernike Term 11 | −0.00012768085 |
| Zernike Term 12 | −7.7561717e−05 |
| Zernike Term 13 | 3.1029238e−05 |
| Zernike Term 14 | −2.52.87591e−06 |
| Zernike Term 15 | 7.4776492e−06 |
| Zernike Term 16 | −1.31828110−07 |
| Zernike Term 17 | 3.2318276e−05 |
| Zernike Term 18 | −2.4551537e−05 |
| Zernike Term 19 | 3.2405995e−06 |
| Zernike Term 20 | −9.7309031e−06 |
| Zernike Term 21 | 2.3498813e−07 |
| Zernike Term 22 | −6.080644e−07 |
| Zernike Term 23 | 9.22190740−07 |
| Zernike Term 24 | 6.81310170−07 |
| Zernike Term 25 | 2.7471074e−07 |
| Surface 24 COORDBRK | |
| Decenter X | 0 |
| Decenter Y | 0 |
| Tilt About X | −13 |
| Tilt About Y | 0 |
| Tilt About Z | 0 |
| Order | Decenter then tilt |
| Surface 25 STANDARD | |
| Surface 26 COORDBRK | |
| Decenter X | 0 |
| Decenter Y | 0 |
| Tilt About X | 12 |
| Tilt About Y | 0 |
| Tilt About Z | 0 |
| Order | Decenter then tilt |
| Surface 27 STANDARD Sphere | |
| Mirror Substrate | Flat, Thickness = 9.00000E+00 |
| Surface 28 COORDBRK | |
| Decenter X | 0 |
| Decenter Y | 0 |
| Tilt About X | 12 |
| Tilt About Y | 0 |
| Tilt About Z | 0 |
| Order | Decenter then tilt |
| Surface 29 STANDARD | |
| Surface 30 COORDBRK | |
| Decenter X | 0 |
| Decenter Y | 0 |
| Tilt About X | −24.418011 |
| Tilt About Y | 0 |
| Tilt About Z | 0 |
| Order | Decenter then tilt |
| Surface 31 COORDBRK | |
| Decenter X | 0 |
| Decenter Y | −0.7230178 |
| Tilt About X | 0 |
| Tilt About Y | 0 |
| Tilt About Z | 0 |
| Order | Decenter then tilt |
| Surface 32 STANDARD | |
| Surface 33 STANDARD | |
| Surface 34 COORDBRK | |
| Decenter X | 0 |
| Decenter Y | −0.7230178 |
| Tilt About X | 24.4180111 |
| Tilt About Y | 0 |
| Tilt About Z | 0 |
| Order | Decenter then tilt |

TABLE III-continued

SURFACE DATA DETAIL

Surface 35 STANDARD
Surface 36 COORDBRK

| | |
|---|---|
| Decenter X | 0 |
| Decenter Y | −5 |
| Tilt About X | −22.847056 |
| Tilt About Y | 0 |
| Tilt About Z | 0 |
| Order | Decenter then tilt |

Surface IMA STANDARD

Figure 4:
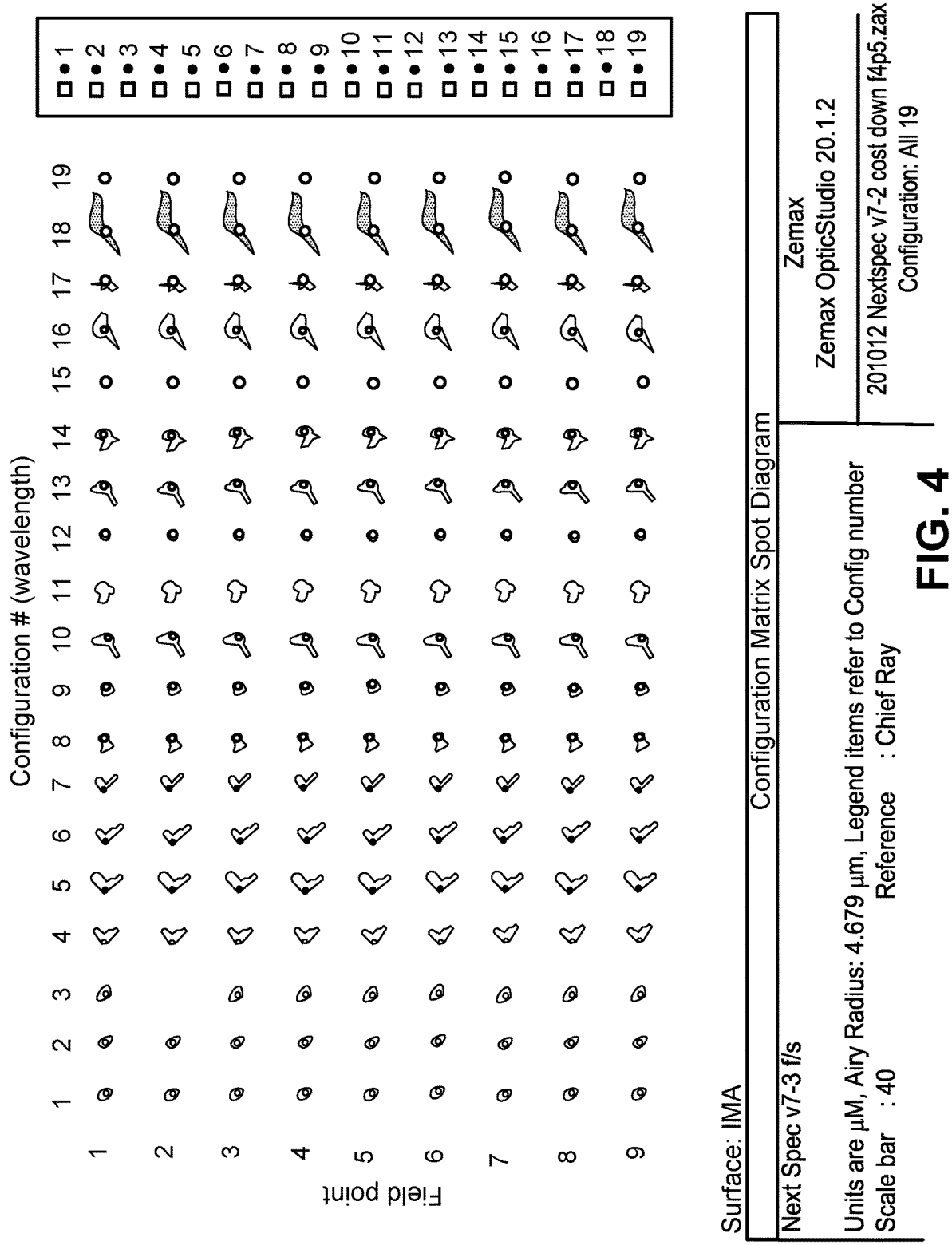
FIG. 4 is a plot showing spot diagrams for different wavelengths and field points for the optical assembly shown in FIG. 3.

Optical assembly 301 can provide a high level of optical performance. Optical performance of optical assembly 301 is exemplified by the spot diagrams shown in FIG. 4, which shows spot diagrams for 19 different wavelengths (horizontal axis) distributed across the echelle orders from M=26 to M=121, at nine different field points (vertical axis) distributed over the slit. The wavelengths shown range from deep in the vacuum ultra-violet (column 6, 166.3 nm) to the infra-red (column 19, 789.0 nm). The worst point in the field for these wavelengths has a spot radius less than 5 microns. Most points are between 3 and 4 microns radius. This geometric spot radius is sufficient to provide picometer level resolution over the spectral range of interest, limited more by the slit width and pixel size than the imaging performance.

Variations of optical assembly 301 are possible. For example, in some embodiments, a transmissive corrector plate can be used in place of the reflective Schmidt corrector plate 305. This geometry can provide similar performance with a more compact design, using a corrector plate that retains an axis of symmetry and may be easier to manufacture.

Alternatively, or additionally, double-pass prism can be replaced with a double pass grating for the cross-disperser, or with a combination grating-prism (e.g., a grism).

Figure 5:
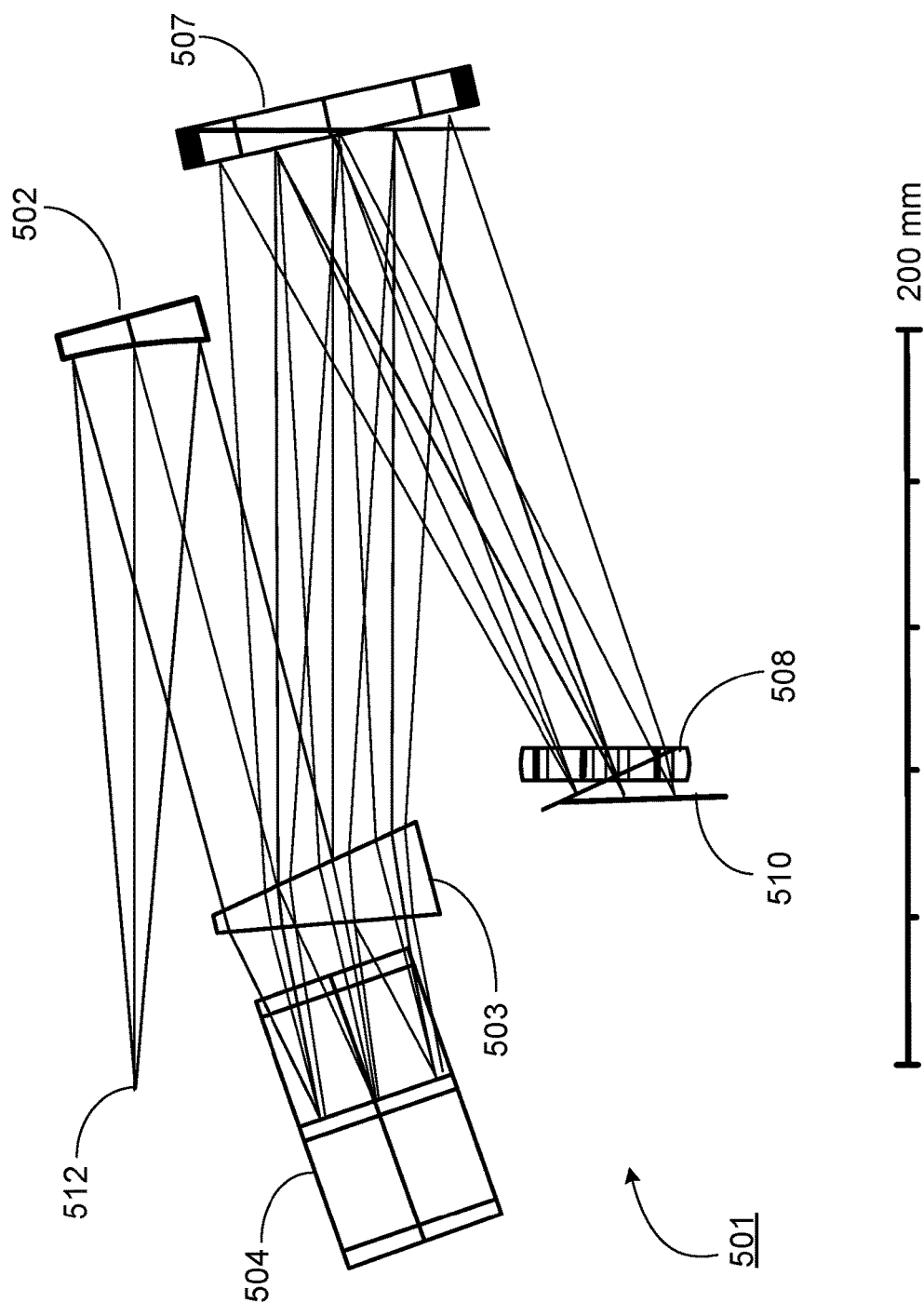
FIG. 5 is an optical layout of another example optical assembly for an echelle spectrometer. This drawing is to scale.

In some embodiments, a separate Schmidt corrector (e.g., Schmidt corrector 305) is not needed and aberrations can be reduced by other optical elements in the assembly. For example, the freeform surface of the collimator can be designed in conjunction with the other components to reduce the spherical aberration, coma, and astigmatism to an acceptable level. For example, referring to FIG. 5, another optical assembly 501 for spectrometer 101 includes a collimator mirror 502 with a freeform surface, a prism 503, an echelle grating 504, a spherical mirror 507, and a field lens 508. In this example, the Schmidt telescope is considered to be composed of spherical mirror 507 and field lens 508 only and omits a separate Schmidt corrector. The function performed by the Schmidt corrector in a conventional Schmidt telescope is performed, at least in part, by collimator 502. Optical assembly 501 receives light from an aperture at point 512 and directs the light along an optical path to an image field at an image plane 510. A file including a prescription table providing details of optical assembly 500 is provided in Tables IV-V, below.

TABLE IV

SURFACE DATA SUMMARY

| Surface | Radius (mm) | Thickness (mm) | Glass | Clear Diam. (mm) | Mech. Diam. (mm) | Conic |
|---|---|---|---|---|---|---|
| OBJ | Infinity | 0 | | 0.3434663 | 0.3434663 | 0 |
| 1 | Infinity | 0 | | 0.3434663 | 0.3434663 | 0 |
| 2 | — | 200 | | — | — | — |
| 3 | −400 | −200 | MIRROR | 139.637 | 41 | −1 |
| 4 | — | 203.4665 | | — | — | — |
| 5 | Infinity | 0 | | 35.53027 | 35.53027 | 0 |
| 6 | — | −150 | | — | — | — |
| 7 | — | 0 | | — | — | — |
| 8 | — | −15 | SIO2 | 53.34466 | 53.34466 | — |
| 9 | — | −50 | | 52.65105 | 52.65105 | — |
| 10 | — | 0 | | — | — | — |
| 11 | — | 0 | | — | — | — |
| STO | Infinity | 0 | MIRROR | 75.73959 | 75.73959 | 0 |
| 13 | — | 0 | | — | — | — |
| 14 | Infinity | 0 | | 45.84674 | 45.84674 | 0 |
| 15 | — | 50 | | — | — | — |
| 16 | — | 15 | SIO2 | 51.15427 | 51.15427 | — |
| 17 | — | 0 | | 55.35947 | 55.35947 | — |
| 18 | — | 0 | | — | — | — |
| 19 | — | 0 | | — | — | — |
| 20 | Infinity | 200 | | 42.51369 | 42.51369 | 0 |
| 21 | Infinity | 0 | | 42.62043 | 42.62043 | 0 |
| 22 | — | 0 | | — | — | — |
| 23 | −400 | 0 | MIRROR | 42.93516 | 42.93516 | 0 |
| 24 | — | 0 | | — | — | — |
| 25 | Infinity | −185 | | 43.08213 | 43.08213 | 0 |
| 26 | — | 0 | | — | — | — |
| 27 | — | 0 | | — | — | — |

TABLE IV-continued

SURFACE DATA SUMMARY

| Surface | Radius (mm) | Thickness (mm) | Glass | Clear Diam. (mm) | Mech. Diam. (mm) | Conic |
|---|---|---|---|---|---|---|
| 28 | Infinity | −8 | SIO2 | 4.963316 | 8.183276 | 0 |
| 29 | Infinity | 0 | | 8.183276 | 8.183276 | 0 |
| 30 | — | 0 | | — | — | — |
| 31 | Infinity | −8 | | 6.462673 | 6.462673 | 0 |
| 32 | — | 0 | | — | — | — |
| IMA | Infinity | | | 6.319724 | 6.319724 | 0 |

TABLE V

SURFACE DATA DETAIL

Surface OBJ STANDARD slit
Surface 1 STANDARD
Surface 2 COORDBRK tilt to coil vertex

| | |
|---|---|
| Decenter X | 0 |
| Decenter Y | 0 |
| Tilt About X | −15 |
| Tilt About Y | 0 |
| Tilt About Z | 0 |
| Order | Decenter then tilt |

Surface 3 FZERNSAG collimator

| | |
|---|---|
| Mirror Substrate | Flat, Thickness = 5.00000E+00 |
| Zernike Decenter X | 0 |
| Zernike Decenter Y | 52.66 |
| Normalization Radius | 70 |
| Zernike Term 1 | 0 |
| Zernike Term 2 | 0 |
| Zernike Term 3 | 0 |
| Zernike Term 4 | 0 |
| Zernike Term 5 | −9.2553901e−05 |
| Zernike Term 6 | 0.0014911969 |
| Zernike Term 7 | −0.006717006 |
| Zernike Term 8 | 0.01573876 |
| Zernike Term 9 | 0.0015667884 |
| Zernike Term 10 | 0.010804217 |
| Zernike Term 11 | 0.015920273 |
| Zernike Term 12 | 0.00090123067 |
| Zernike Term 13 | −0.0012581525 |
| Zernike Term 14 | 0.0028138392 |
| Zernike Term 15 | −0.0025174615 |
| Zernike Term 16 | −0.00066551695 |
| Aperture | Circular Aperture |
| Minimum Radius | 0 |
| Maximum Radius | 20.5 |
| X- Decenter | 0 |
| Y- Decenter | −52.661 |

Surface 4 COORDBRK return to coll normal

| | |
|---|---|
| Decenter X | 0 |
| Decenter Y | 0 |
| Tilt About X | 15 |
| Tilt About Y | 0 |
| Tilt About Z | 0 |
| Order | Decenter then tilt |

Surface 5 STANDARD
Surface 6 COORDBRK rotate 15 deg

| | |
|---|---|
| Decenter X | 0 |
| Decenter Y | 0 |
| Tilt About X | −15 |
| Tilt About Y | 0 |
| Tilt About Z | 0 |
| Order | Decenter then tilt |

Surface 7 COORDBRK tilt-dec prism

| | |
|---|---|
| Decenter X | 0 |
| Decenter Y | −10 |
| Tilt About X | 0 |
| Tilt About Y | 0 |

TABLE V-continued

SURFACE DATA DETAIL

| | |
|---|---|
| Tilt About Z | 0 |
| Order | Decenter then tilt |
| Surface 8 TILT SURF prism surface 1 | |
| | |
| X Tangent | 0 |
| Y Tangent | −0.18 |
| Aperture | Rectangular Aperture |
| X Half Width | 30 |
| Y Half Width | 30 |
| Surface 9 TILTSURF prism surface 2 | |
| | |
| X Tangent | 0 |
| Y Tangent | 0.18 |
| Aperture | Rectangular Aperture, Pickup From Surface 8 |
| X Half Width | 30 |
| Y Half Width | 30 |
| Surface 10 COORDBRK | |
| | |
| Decenter X | 0 |
| Decenter Y | 0 |
| Tilt About X | −4 |
| Tilt About Y | 0 |
| Tilt About Z | 0 |
| Order | Decenter then tilt |
| Surface 11 COORDBRK Gamma and blaze angle | |
| | |
| Decenter X | 0 |
| Decenter Y | 0 |
| Tilt About X | 0 |
| Tilt About Y | 63 |
| Tilt About Z | 0 |
| Order | Decenter then tilt |
| Surface STO DGRATING echelle | |

| | | | | | |
|---|---|---|---|---|---|
| Mirror Substrate | Flat, Thickness = 1.00000E+01 | | | | |
| Tilt/Decenter Order | Decenter X | Decenter Y | Tilt X | Tilt Y | Tilt Z |
| Before surface | 0 | 0 | 0 | 0 | 90 Decenter, Tilt |
| After surface | −0 | −0 | −0 | −0 | −90 Tilt, Decenter |

| | |
|---|---|
| Lines/μm | 0.087 |
| Diffraction Order | 97 |
| Aperture | Rectangular Aperture |
| X Half Width | 21.5 |
| Y Half Width | 40.5 |
| Surface 13 COORDBRK Return blaze and gamma angle | |
| | |
| Decenter X | 0 |
| Decenter Y | 0 |
| Tilt About X | 0 |
| Tilt About Y | −63 |
| Tilt About Z | 0 |
| Order | Tilt then decanter |
| Surface 14 STANDARD | |
| Surface 15 COORDBRK return to prism 2 | |
| | |
| Coordinate Return Solve | Orientation XYZ, To Surface 9 |
| Decenter X | −0 |
| Decenter Y. | −0 |
| Tilt About X | 4 |
| Tilt About Y | −0 |
| Tilt About Z | 0 |
| Order | Tilt then decanter |
| Surface 16 TILTSURF prism s2 redux | |
| | |
| X Tangent | 0 |
| Y Tangent | 0.18 |
| Aperture | Rectangular Aperture, Pickup From Surface 9 |
| X Half Width | 30 |
| Y Half Width | 30 |
| Surface 17 TILTSURF prism s1 redux | |
| | |
| X Tangent | 0 |
| Y Tangent | −0.18 |
| Aperture | Rectangular Aperture, Pickup From Surface 8 |
| X Half Width | 30 |
| V Half Width | 30 |

TABLE V-continued

SURFACE DATA DETAIL

Surface 18 COORDBRK return prism MN.

| | |
|---|---|
| Coordinate Return Solve | Orientation XYZ, To Surface 17 |
| Decenter X | −0 |
| Decenter Y | −0 |
| Tilt About X | 0 |
| Tilt About Y | −0 |
| Tilt About Z | 0 |
| Order | Tilt then decenter |

Surface 19 COORDBRK Center chief ray on imager

| | |
|---|---|
| Decenter X | 1.2511139 |
| Decenter Y | −5.3800819 |
| Tilt About X | 14.857351 |
| Tilt About Y | 1.2114754 |
| Tilt About Z | 0 |
| Order | Decenter then tilt |

Surface 20 STANDARD
Surface 21 STANDARD
Surface 22 COORDBRK

| | |
|---|---|
| Decenter X | 0 |
| Decenter Y | 0 |
| Tilt About X | −12 |
| Tilt About Y | −0 |
| Tilt About Z | 0 |
| Order | Decenter then tilt |

Surface 23 STANDARD Sphere

| | |
|---|---|
| Mirror Substrate | Flat, Thickness = 9.00000E+00 |

Surface 24 COORDBRK

| | |
|---|---|
| Decenter X | 0 |
| Decenter Y | 0 |
| Tilt About X | −12 |
| Tilt About Y | −0 |
| Tilt About Z | 0 |
| Order | Decenter then tilt |

Surface 25 STANDARD
Surface 26 COORDBRK

| | |
|---|---|
| Decenter X | 0 |
| Decenter Y | 0 |
| Tilt About X | 24.418011 |
| Tilt About Y | −0 |
| Tilt About Z | 0 |
| Order | Decenter then tilt |

Surface 27 COORDBRK

| | |
|---|---|
| Decenter X | 0 |
| Decenter Y | 0.7230178 |
| Tilt About X | −0 |
| Tilt About Y | −0 |
| Tilt About Z | 0 |
| Order | Decenter then tilt |

Surface 28 STANDARD
Surface 29 STANDARD
Surface 30 COORDBRK

| | |
|---|---|
| Decenter X | 0 |
| Decenter Y | −0.7230178 |
| Tilt About X | −24.418011 |
| Tilt About Y | −0 |
| Tilt About Z | 0 |
| Order | Decenter then tilt |

Surface 31 STANDARD
Surface 32 COORDBRK

| | |
|---|---|
| Decenter X | 0 |
| Decenter Y | −5 |
| Tilt About X | 22.847056 |
| Tilt About Y | −0 |
| Tilt About Z | 0 |
| Order | Decenter then tilt |

Surface IMA STANDARD

Collimator 502 has a mirror surface designed by adding Zernike coefficients to the parabola and re-optimizing the design. In some embodiments, only the first 16 terms of the Zernike polynomial are used, but more terms can be added with incremental impact on performance. Echelle grating 504 is located approximately one radius of curvature from spherical mirror 507 (e.g., from 0.8R to 1.2R, where R is the radius of curvature of the spherical mirror).

Other optical assemblies are also possible. For example, in some embodiments, the optical assembly can include additional optical elements including optical elements with optical power or with no optical power. In some embodiments, the optical assembly can include an optical relay sub-assembly (e.g., a dioptric, catoptric, or catadioptric relay). Alternatively or additionally, certain embodiments can include one or more fold mirrors to fold the optical path of the light.

While the foregoing embodiments feature optical assemblies suitable for an echelle spectrometer, the optical design principles disclosed can be applied to other optical systems too. For example, a projection illumination system often uses a pair of scanning mirrors to create a visual "field of view", where the entire field is passing through the source module at the same angle of incidence before being distributed across the desired angular range. Using the approach defined above, a freeform corrector could be added to this source module to correct the spherical aberrations of a down-stream spherical reflector. This could be useful in applications such as laser machining, augmented reality, and heads-up displays.

A number of embodiments have been described. Other embodiments are in following claims.

What is claimed is:

1. A spectrometer, comprising:
   an optical assembly comprising a plurality of optical elements arranged to receive light from a light source and direct the light along a light path to a multi-element detector, dispersing light of different wavelengths to different spatial locations on the multi-element detector, the optical assembly comprising:
   a collimator arranged in the light path to receive the light from the light source, the collimator comprising a mirror having a freeform surface;
   a dispersive sub-assembly comprising an echelle grating, the dispersive sub-assembly being arranged in the light path to receive light from the collimator; and
   a Schmidt telescope arranged in the light path to receive light from the dispersive sub-assembly and focus the light to a field, the multi-element detector being arranged at the field.

2. The spectrometer of claim 1, wherein the freeform surface is shaped to reduce optical aberrations associated with the Schmidt telescope.

3. The spectrometer of claim 1, wherein the freeform surface is shaped according to a parabolic surface modified by one or more non-zero coefficients of orthogonal polynomial functions.

4. The spectrometer of claim 1, wherein the echelle grating is arranged to disperse the light into constituent wavelengths in a first plane and the collimator comprises a second dispersive optical element arranged to disperse the light into constituent wavelengths along a second plane orthogonal to the first plane.

5. The spectrometer of claim 4, wherein the second dispersive optical element is selected from the group consisting of a diffraction grating, a prism, and a grism.

6. The spectrometer of claim 5, wherein the second dispersive optical element is a prism comprising two flat, non-parallel surfaces arranged in the light path.

7. The spectrometer of claim 4, wherein the second dispersive element is arranged in the light path so that the light makes a double pass through the second dispersive element.

8. The spectrometer of claim 7, wherein the second dispersive element is arranged in the light path so that the light makes a first pass through the second dispersive element before incidence on the echelle grating and the light makes a second pass through the second dispersive element after incidence on the echelle grating.

9. The spectrometer of claim 7, wherein the second dispersive element is arranged in the light path so that the light makes both passes through the second dispersive element after incidence on the echelle grating.

10. The spectrometer of claim 1, wherein the Schmidt telescope is an off-axis Schmidt telescope.

11. The spectrometer of claim 1, wherein the Schmidt telescope comprises a spherical mirror and a field lens.

12. The spectrometer of claim 11, wherein the field lens comprises an aspheric lens configured to reduce a curvature of an image field of the Schmidt telescope.

13. The spectrometer of claim 11, wherein the field lens is tilted with respect to an optical axis of the Schmidt telescope.

14. The spectrometer of claim 11, wherein the Schmidt telescope comprises a Schmidt corrector arranged in the light path between the dispersive sub-assembly and the mirror of the Schmidt telescope.

15. The spectrometer of claim 14, wherein the Schmidt corrector is a mirror.

16. The spectrometer of claim 14, wherein the Schmidt corrector comprises an aspheric optical surface or a freeform surface.

17. The spectrometer of claim 1, further comprising an aperture arranged in the light path between the light source and the optical assembly.

18. The spectrometer of claim 1, wherein the optical assembly further comprises a Schmidt corrector arranged in the light path downstream from the dispersive sub-assembly.

19. The spectrometer of claim 1, wherein the light source is an inductively coupled plasma (ICP) system.

20. The spectrometer of claim 1, wherein the optical assembly is arranged for operation across a band of wavelengths in a range from about 160 nm to about 900 nm.

21. The spectrometer of claim 1, wherein the optical assembly is configured such that the light is incident on the collimator only once along the light path.

* * * * *